(12) United States Patent
Li et al.

(10) Patent No.: US 9,994,467 B2
(45) Date of Patent: Jun. 12, 2018

(54) UNPOWERED WATER PURIFICATION SYSTEM FOR A RIVERFRONT LANDSCAPE CONSTRUCTED WETLAND

(71) Applicant: Soochow University, Suzhou, Jiangsu (CN)

(72) Inventors: Mengying Li, Jiangsu (CN); Liqun Xie, Jiangsu (CN); Jiangang Zhang, Jiangsu (CN); Linhua Feng, Jiangsu (CN); Yuliang Xu, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 106 days.

(21) Appl. No.: 15/128,136

(22) PCT Filed: May 6, 2015

(86) PCT No.: PCT/CN2015/078343
§ 371 (c)(1),
(2) Date: Sep. 22, 2016

(87) PCT Pub. No.: WO2016/172991
PCT Pub. Date: Nov. 3, 2016

(65) Prior Publication Data
US 2017/0107131 A1    Apr. 20, 2017

(30) Foreign Application Priority Data

Apr. 28, 2015    (CN) .......................... 2015 1 0207483

(51) Int. Cl.
*C02F 3/32*    (2006.01)
*E02B 3/04*    (2006.01)
(Continued)

(52) U.S. Cl.
CPC ................ *C02F 3/327* (2013.01); *C02F 3/06* (2013.01); *E02B 3/04* (2013.01); *E02B 3/12* (2013.01); *C02F 2103/007* (2013.01)

(58) Field of Classification Search
CPC .. C02F 3/046; C02F 3/06; C02F 3/327; C02F 2103/007
(Continued)

(56) References Cited

U.S. PATENT DOCUMENTS 5,766,474 A * 6/1998 Smith ..................... C02F 3/327
                                                    210/602
6,793,810 B1 * 9/2004 Takahashi ................. C02F 3/06
                                                    210/150
(Continued)

FOREIGN PATENT DOCUMENTS

CN            1632231 A      6/2005
CN            1935700 A      3/2007
(Continued)

*Primary Examiner* — Christopher Upton
(74) *Attorney, Agent, or Firm* — SZDC Law P.C.

(57) ABSTRACT

The invention discloses an unpowered water purification system for a riverfront landscape constructed wetland, comprising a riparian wetland constructed along a lake-land ecotone of a river, lake-pond. The riparian wetland comprises a plurality of alternatively arranged wetland islands and watercourses formed between them. The bottom surface of the riparian wetland is lower than the normal water level of the river, lake-pond, and the upper surface of the wetlands is flush with the normal water level of the river, lake-pond. Plants are planted on the wetlands. A revetment is constructed between the riparian wetland and the river, lake-pond, and its upper surface is between the bottom surface of the riparian wetland and the upper surface of the wetlands. The invention achieves good purification and landscape effects. The purification system has some advantages such as good landscape effects, simple management without energy and power consumption, and thus is durable and stable.

7 Claims, 2 Drawing Sheets

(51) Int. Cl.
*E02B 3/12* (2006.01)
*C02F 3/06* (2006.01)
*C02F 103/00* (2006.01)

(58) Field of Classification Search
USPC .................. 210/170.09, 170.1, 602, 747.5
See application file for complete search history.

(56) References Cited

U.S. PATENT DOCUMENTS

| | | | |
|---|---|---|---|
| 8,287,728 B2 * | 10/2012 | Kania | C02F 3/327 |
| | | | 210/150 |
| 8,641,893 B2 * | 2/2014 | Torres Junco | C02F 3/327 |
| | | | 210/170.09 |
| 2012/0006743 A1 * | 1/2012 | Streb | C02F 3/327 |
| | | | 210/602 |

FOREIGN PATENT DOCUMENTS

| | | |
|---|---|---|
| CN | 201065367 Y | 5/2008 |
| CN | 102061677 A | 5/2011 |
| CN | 102219305 A | 10/2011 |
| CN | 103241893 A | 8/2013 |
| CN | 103663859 A | 3/2014 |
| CN | 103993579 A | 8/2014 |
| CN | 104005364 A | 8/2014 |
| CN | 203939006 U | 11/2014 |
| KR | 101175306 B1 | 8/2012 |

\* cited by examiner

UNPOWERED WATER PURIFICATION SYSTEM FOR A RIVERFRONT LANDSCAPE CONSTRUCTED WETLAND

This application is a national phase application of PCT/CN2015/078343, filed on May 6, 2015, which claims priority to Chinese Patent Application No. CN 201510207483.7, filed on Apr. 28, 2015, which is incorporated by reference for all purposes as if fully set forth herein.

FIELD OF THE INVENTION

The present invention relates to the technical field of river comprehensive treatment, and more particularly to an unpowered water purification system for a riverfront landscape constructed wetland.

DESCRIPTION OF THE RELATED ART

Today, the governance of polluted rivers using constructed wetlands integrates many advantages such as low-cost, environmental friendly, high purification ability as well as good landscape effects.

In the current riparian wetlands constructed by means of river bank space or green belts, for purifying water body's such as a river, lake-pond, some are sloping or stepped artificial wetlands higher than the water surface, for example, a method for constructing a stepped subsurface flow constructed wetland system (Publication No.: 103663859A), a riverside ecological multidimensional circulating percolation interception system of wetland slow flows (Publication No.: 103993579A), and a molding method of landscape multi-stepped constructed wetland revetments (Publication No.: 1632231). In rainy days, such wetlands have good effects on interception of the non-point source pollution into the river. However, in the days without rain, on the one hand, the wetlands higher than the water surface will not play a part in purification of rivers and thus lead to a low wetland availability, on the other hand, due to facing the state of drought, the aquatic plants need frequent watering, this will cause the cumbersome management and high plant maintenance costs.

Some are retaining dams constructed in river channels for raising the water level, such that the river water can be directed to the higher wetlands in river bank. For example: a purification system of full-section water wetland under normal water level of river channels (Publication No.: 102061677A). Such riparian wetland management methods have the advantage of high wetland availability, but the construction of dams has some defects such as high construction cost, adverse effects on the security of river channels and poor flood control ability.

There are some still other methods in which the river water is pumped into higher or lower constructed wetlands. For example, a treatment system of combined constructed wetlands of eutrophicated river and lake water body's with initial rainwater (Publication No.: 1935700). However, due to the huge quantity of water of rivers, lake-ponds, the methods utilizing pumps have significant defects such as great energy consumption and high operating cost. Actually, in practical applications, such methods will cause great economic burden to local governments, and thus is unsustainable.

SUMMARY OF THE INVENTION

In order to solve the above problems of the prior art, one object of the present invention is to provide an unpowered water purification system for a riverfront landscape constructed wetland.

For the above technical purpose and effects, the invention utilizes the following technical solutions: an unpowered water purification system for a riverfront landscape constructed wetland, which comprises:

a riparian wetland constructed along a lake-land ecotone of a river, lake-pond, wherein the riparian wetland comprises a plurality of alternatively arranged wetland islands and watercourses formed between adjacent wetland islands, the bottom surface of the riparian wetland is lower than the normal water level of the river, lake-pond, and the upper surface of the wetland islands is flush with the normal water level of the river, lake-pond, a plant is planted on the wetland island; and a revetment constructed between the riparian wetland and the river, lake-pond, wherein the upper surface of the revetment is between the bottom surface of the riparian wetland and the upper surface of the wetland islands.

Preferably, the width of the riparian wetland is 3-5 m. The bottom surface of the riparian wetland is 50 cm lower than the normal water level of the river, lake-pond, and the upper surface of the revetment is 20-30 cm higher than the bottom surface of the riparian wetland.

Preferably, a 10 cm thick layer of gravels is paved on the bottom surface of the watercourses, and the diameter of the gravels is 1-2 cm.

Preferably, a triangular base is disposed at a lower portion of and behind the revetment for reinforcing the revetment.

In an embodiment, the wetland island is configured as a circular structure with a diameter of 80-160 cm. The outer circle of the wetland island is a gabion mesh, a stainless steel mesh is disposed at the inner side of the gabion mesh, a circle of ecological cloth is disposed at the inner side of the stainless steel mesh, and a gravel circle filled with gravels is arranged between the stainless steel mesh and the ecological cloth. The aperture of the stainless steel mesh is less than the diameter of the gravels of the gravel circle. A soil circle filled with soil is inside an inner circle constructed by the ecological cloth.

Preferably, a reinforcing rib is provided at the periphery of the gabion mesh, a metal circle is disposed on the soil circle for facilitating the growth of the plant, and 8 lacing wires being disposed between the upper edge of the gabion mesh and the metal circle.

In another embodiment, the wetland island is configured as a square or rectangular structure and both the length and width of the wetland island are 80-160 cm. The framework of the wetland island is a gabion mesh, a stainless steel mesh is disposed at the inner side of the gabion mesh, a circle of ecological cloth is disposed at the inner side of the stainless steel mesh, and a gravel circle filled with gravels is arranged between the stainless steel mesh and the ecological cloth. The aperture of the stainless steel mesh is less than the diameter of the gravels of the gravel circle. A soil circle filled with soil is inside an inner circle constructed by the ecological cloth.

Preferably, a water-resistant tree is planted on the soil circle, and the water-resistant tree includes *Taxodium distichum* or *Taxodium mucronatum*.

Preferably, an emerged plant is planted on the gravel circle, and the emerged plant is selected from the group of *Iris pseudacorus* L., *Iris tectorum*, *Canna indica* L., *Pontederia cordata* L, *Pontederia cordata* pickerelweed, *Cyperus alternifolius*, *Thalia dealbata*, *Lythrum salicaria* or *Phragmites*.

The working principle of the invention is as following:

In the invention a riparian wetland with beautiful landscape effects is constructed in the waterfront, and the riparian wetland consists of alternatively arranged wetland islands and the peripheral watercourses of the wetland islands. The upper water body of the river, lake-pond intensely fluctuates, frequently impacts the wetland islands and flows in the watercourses of the wetland islands, this facilitates the strong exchange of water bodies inside and outside the wetland islands, thus, the biofilm in the wetland islands will capture, degrade and transform a large amount of pollutants in the water body, thereby purifying the water body of the river, lake-pond.

Furthermore, the biofilm in the wetland islands also can obtain sufficient oxygen based on the facts that: both the water of the wetland islands in the superficial layer of the water body and the water of watercourses have strong reoxygenation abilities, the plants on the wetlands can rapidly deliver the oxygen into the wetland islands via root system, and the change of water level of the river, lake-pond causes that the wetland islands intermittently emerge from the water, such that the biofilm in the wetland islands obtains a large amount of oxygen. Thus, the good water-oxygen exchange ability inside and outside the wetland islands leads to the great water purification ability.

The regulation of the water body of the river, lake-pond shall not be resource-wasted or energy-wasted, and the river regulation shall be more natural, simple and sustainable, and has low maintenance cost and good ecological landscape.

Due to the above technical solutions, the present invention has the following advantages as compared with the prior art:

(1) the purification system of the invention is unpowered and sustainable economically. Because the outer circle matrix of the wetland islands have high porosity and good penetration ability, both the fluctuation of the water body and the change of the water level arisen from waves and sailing will facilitate the frequent exchange of the water bodies inside and outside the wetland islands, so that the biofilm of the matrix in the wetland islands capture, degrade and transforms more pollutants, thereby achieving good purification function of water body.

(2) the riparian wetland of the invention have good effects on interception of non-point source pollution and purification of river water, and have the purification function of water body in rainy or rainless conditions.

(3) the riparian wetland of the invention consists of simple wetland islands, and there isn't any hydraulic engineering structure and device, such as a dam and a water pump, this will not produce any influence on flood flowing in river, and can increase the water storage of the river channels, and thus have better storage regulation functions. Furthermore, the maintenance of engineering structure and device is avoided, thus the riparian wetland is sustainable.

(4) open watercourses are provided at the peripheral of the wetland islands, and the phenomenon that the conventional constructed wetlands are blocked after being used for a few years will not occur.

(5) the invention provides a better riparian landscape, and each wetland island of the wetland just like a color block of a picture, and various patterns can be designed by combining the color blocks (i.e., the wetland islands with plants).

Multiple patterns can be formed by combining the plants on the wetland islands. The riparian wetland of the invention combines the land virescence with river water purification, and thus not only the function of landscape greening is retained, but also the function of water body purification can be achieved.

(6) some water-resistant trees are planted on the wetland islands of the invention, thus, not only the ecological landscape effects can be achieved, but also the harvest management of the winter plants needed for the normal wetlands can be omitted, this tends to be more natural.

BRIEF DESCRIPTION OF THE DRAWINGS

The present invention is explained more precisely with reference to the figures attached, by way of example only, in which.

wherein: 1. a lake-land ecotone of a river, lake-pond; 2, a wetland island; 3, a river, lake-pond; 4, a plant; 5, a revetment; 6, a riparian wetland; 7, a triangular base; 21, a gabion mesh; 22, a stainless steel mesh; 23, an ecological cloth; 24, a gravel circle; 25, a soil circle; 26, a reinforcing rib; 27, a metal circle; 28, a lacing wire.

DESCRIPTION OF THE PREFERRED EMBODIMENTS

The invention will be further illustrated in more detail with reference to accompanying drawings. It is noted that, the following embodiments are intended for purposes of illustration only and are not intended to limit the scope of the invention.

Embodiment 1

Figure 1:
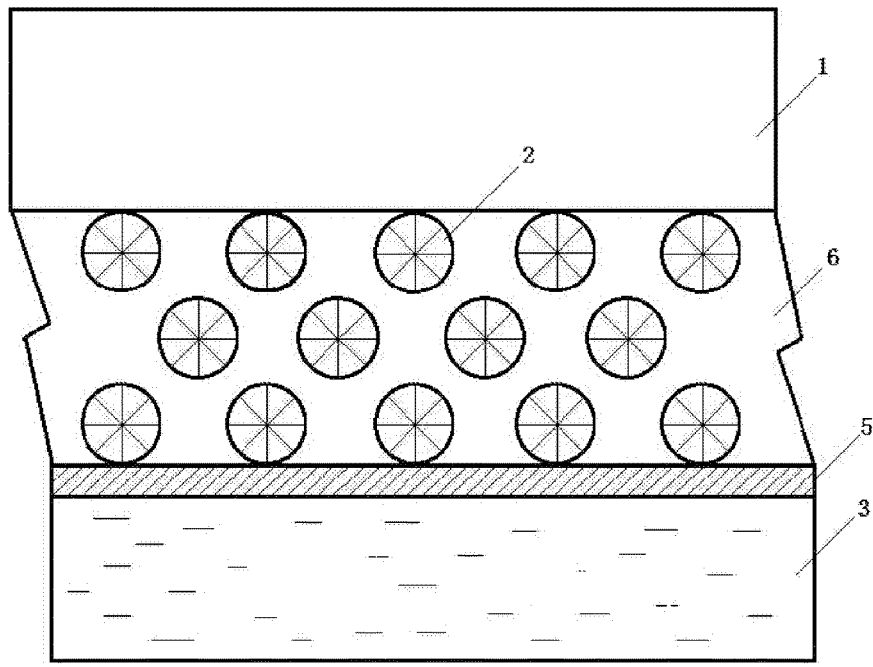
FIG. 1 is a top view of an unpowered water purification system according to the invention.
Figure 2:
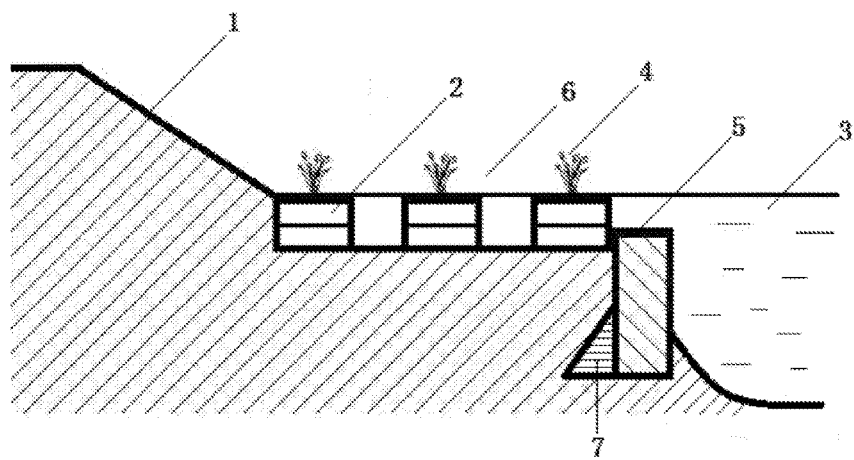
FIG. 2 is a sectional view of the unpowered water purification system according to the invention.
Figure 3:
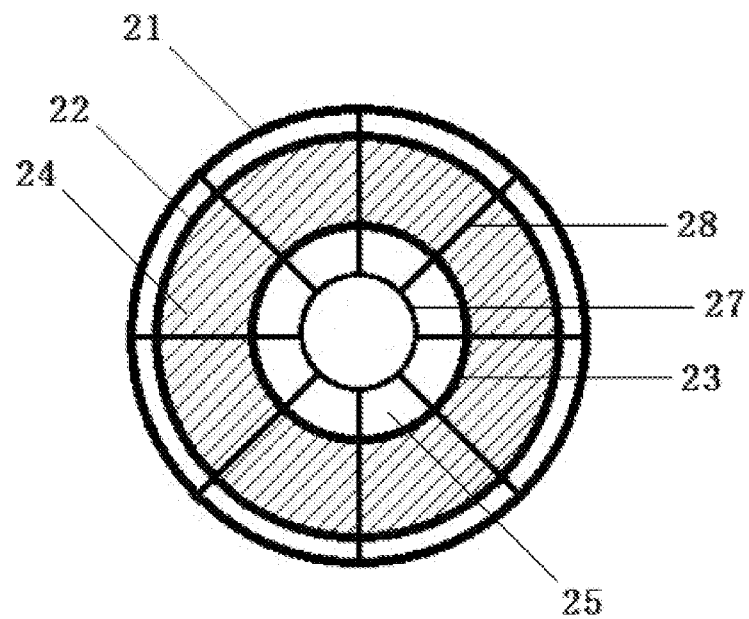
FIG. 3 is a top view of a circular wetland island of the invention.
Figure 4:
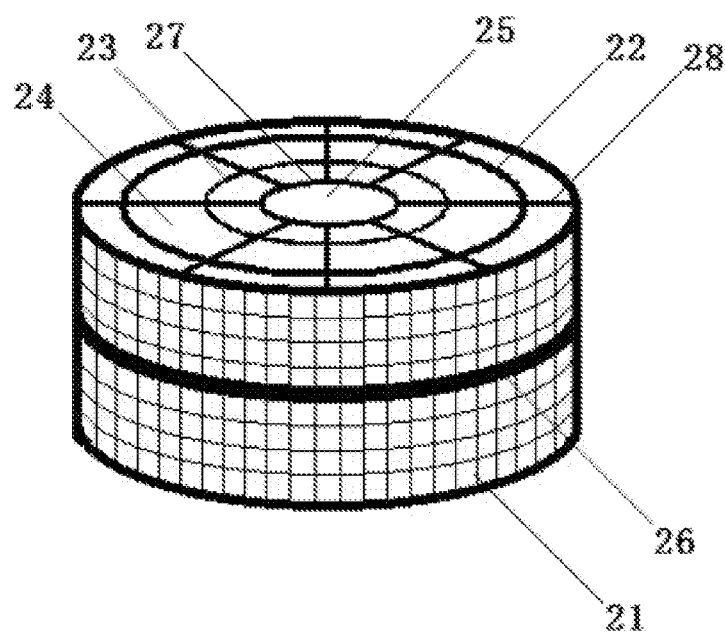
FIG. 4 is a schematic view of the circular wetland island of the invention.

Referring to FIGS. 1-4, an unpowered water purification system for a riverfront landscape constructed wetland is provided in the invention, and the unpowered water purification system comprises a riparian wetland 6 which is constructed along a terrestrial-aquatic transverse zone of a river, lake-pond, and has a width of 3-5 m. The riparian wetland 6 consists of a plurality of alternatively arranged wetland islands 2 and the watercourses formed between adjacent wetland islands 2.

The wetland island 2 is configured as a circular structure with a diameter of 80-160 cm. The outer circle of the wetland island 2 is a gabion mesh 21, and a stainless steel mesh 22 is disposed at the inner side of the gabion mesh 21. A circle of ecological cloth 23 is disposed at the inner side of the stainless steel mesh 22, and a gravel circle 24 filled with gravels is disposed between the stainless steel mesh 22 and the ecological cloth 23. The aperture of the stainless steel mesh 22 is less than the diameter of the gravels of the gravel circle 24. A soil circle 25 filled with soil is inside the inner circle constructed by the ecological cloth 23.

A reinforcing rib 26 is disposed at the periphery of the gabion mesh 21. A metal circle 27 is additionally provided on the soil circle 25 for facilitating the growth of the plant 4. 8 lacing wires are disposed between the upper edge of the gabion mesh 21 and the metal circle 27. Some emerged plants, such as *Iris tectorum* and *Canna indica* L, are planted on the gravel circle 24. Some water-resistant trees, such as *Taxodium distichum* and *Taxodium mucronatum*, are planted on the metal circle 27 of the soil circle 25.

The bottom surface of the riparian wetland 6 is 50 cm lower than the normal water level of the river, lake-pond 3. The upper surface of the wetland islands 2 is flush with the normal water level of the river, lake-pond 3. A 10 cm thick layer of gravels is paved on the bottom surface of the watercourses, and the diameter of the gravels is 1-2 cm. A revetment 5 is constructed between the riparian wetland 6 and the river, lake-pond 3, and the revetment 5 consists of round timber piles and a gabion. Round timber piles are piled on the river bank between the riparian wetland 6 and the river, lake-pond 3 at intervals of 50-100 cm. A gabion with a diameter of 20 cm is disposed at the inner side of the round timber piles, and the gabion is made of a cylindrical fishing net filled with gravels. The gabion is fixed with the round timber piles. A triangular base 7 is disposed at a lower portion and behind the gabion for reinforcing the gabion. The upper surface of the gabion is 20 cm higher than the bottom surface of the riparian wetland 6, to prevent the gravels paved on the watercourses from sliding into the river.

Embodiment 2

Referring to FIGS. 1-4, an unpowered water purification system for a riverfront landscape constructed wetland is provided in the invention, and the unpowered water purification system comprises a riparian wetland 6 which is constructed along a terrestrial-aquatic transverse zone 1 of a river, lake-pond, and has a width of 3-5 m. the riparian wetland 6 consists of a plurality of alternatively arranged wetland islands 2 and the watercourses formed between adjacent wetland islands 2.

The wetland island 2 is configured as a circular structure with a diameter of 80-160 cm. The outer circle of the wetland island 2 is a gabion mesh 21, and a stainless steel mesh 22 is disposed at the inner side of the gabion mesh 21. A circle of ecological cloth 23 is disposed at the inner side of the stainless steel mesh 22, and a gravel circle 24 filled with gravels is disposed between the stainless steel mesh 22 and the ecological cloth 23. The aperture of the stainless steel mesh 22 is less than the diameter of the gravels of the gravel circle 24. A soil circle 25 filled with soil is inside the inner circle constructed by the ecological cloth 23.

A reinforcing rib 26 is disposed at the periphery of the gabion mesh 21. A metal circle 27 is additionally provided on the soil circle 25 for facilitating the growth of the plant 4. 8 lacing wires are disposed between the upper edge of the gabion mesh 21 and the metal circle 27. Some emerged plants, such as *Iris tectorum* and *Canna indica* L, are planted on the gravel circle 24. Some water-resistant trees, such as *Taxodium distichum* and *Taxodium mucronatum*, are planted on the metal circle 27 of the soil circle 25.

The bottom surface of the riparian wetland 6 is 50 cm lower than the normal water level of the river, lake-pond 3. The upper surface of the wetland islands 2 is flush with the normal water level of the river, lake-pond 3. A 10 cm thick layer of gravels is paved on the bottom surface of the watercourses, and the diameter of the gravels is 1-2 cm. A revetment 5 is constructed between the riparian wetland 6 and the river, lake-pond 3, and the revetment 5 is a stone revetment and a triangular base 7 is disposed at a lower portion and behind the stone revetment for reinforcing the stone revetment. The upper surface of the stone revetment is 20-30 cm higher than the bottom surface of the riparian wetland 6, to prevent the gravels paved on the watercourses from sliding into the river.

Embodiment 3

Referring to FIGS. 1-4, an unpowered water purification system for a riverfront landscape constructed wetland is provided in the invention, and the unpowered water purification system comprises a riparian wetland 6 which is constructed along a terrestrial-aquatic transverse zone 1 of a river, lake-pond, and has a width of 3-5 m. the riparian wetland 6 consists of a plurality of alternatively arranged wetland islands 2 and the watercourses formed between adjacent wetland islands 2.

The wetland island 2 is configured as a circular structure with a diameter of 80-100 cm. The outer circle of the wetland island 2 is a gabion mesh 21, and a stainless steel mesh 22 is disposed at the inner side of the gabion mesh 21. Gravels are filled inside the stainless steel mesh 22, and the aperture of the stainless steel mesh 22 is less than the diameter of the gravels.

The bottom surface of the riparian wetland 6 is 50 cm lower than the normal water level of the river, lake-pond 3. The upper surface of the wetland islands 2 is flush with the normal water level of the river, lake-pond 3. A 10 cm thick layer of gravels is paved on the bottom surface of the watercourses, and the diameter of the gravels is 1-2 cm. A revetment 5 is constructed between the riparian wetland 6 and the river, lake-pond 3, and the revetment 5 is a stone revetment, a triangular base 7 is disposed at a lower portion and behind the stone revetment for reinforcing the stone revetment. The upper surface of the stone revetment is 20-30 cm higher than the bottom surface of the riparian wetland 6, to prevent the gravels paved on the watercourses from sliding into the river.

A reinforcing rib 26 is disposed at the periphery of the gabion mesh 21. 8 lacing wires 28 are disposed between the upper edge of the gabion mesh 21 and the metal circle 27. Only emerged plants, such as *Iris pseudacorus, Iris tectorum, Canna indica* L., *Pontederia cordata* L, *Lythrum salicaria* or *Phragmites*, are planted on the gravels of the wetland islands 2. Each wetland island 2 is a color point. The wetland islands may utilize combined plants with different colors of leaves, for example, a combination of *Iris pseudacorus, Iris tectorum, Pontederia cordata* pickerelweed, *Cyperus alternifolius* and *Lythrum salicaria* having green leaves with *Canna indica* L. having red leaves. Alternatively, the wetland islands may utilize combined plants with different flower colors so that the riparian wetland 6 can have a certain pattern. Furthermore, finer patterns can be achieved by increasing the number of the color points (the wetland islands 2) of the riparian wetland 6.

The above preferred embodiments are described for illustration only, and are not intended to limit the scope of the invention. It should be understood, for a person skilled in the art, that various improvements or variations can be made therein without departing from the spirit and scope of the invention, and these improvements or variations should be covered within the protecting scope of the invention.

What is claimed is:

1. An unpowered water purification system for a wetland comprises:
   a riparian wetland (6) constructed along a water-land ecotone (1) of a river or lake-pond (3), wherein the riparian wetland (6) comprises a plurality of alternatively arranged wetland islands (2) and watercourses formed between adjacent wetland islands (2), the bottom surface of the riparian wetland (6) being lower than the normal water level of the river, lake-pond (3), and the upper surface of the wetland islands (2) being flush with the normal water level of the river, lake-pond (3), a plant (4) being planted on the wetland island (2); and
   a revetment (5) constructed between the riparian wetland (6) and the river, lake-pond (3), wherein the upper surface of the revetment (5) is between the bottom surface of the riparian wetland (6) and the upper surface of the wetland islands (2), wherein the wetland island (2) is configured as a circular structure with a diameter of 80-160 cm, the outer circle of the wetland island (2) being a gabion mesh (21), a stainless steel mesh (22) being located inside the gabion mesh (21), a circle of ecological cloth (23) being located inside the stainless steel mesh (22), a gravel circle (24) being located between the stainless steel mesh (22) and the ecological cloth (23), the mesh size of the stainless steel mesh (22) being less than the sizes of gravels being disposed in the gravel circle (24), and a soil circle (25) being located inside an inner circle constructed by the ecological cloth (23).

2. The unpowered water purification system as claimed in claim 1, wherein the width of the riparian wetland (6) is 3-5 m, the bottom surface of the riparian wetland (6) being 50 cm lower than the normal water level of the river, lake-pond (3), and the upper surface of the revetment (5) being 20-30 cm higher than the bottom surface of the riparian wetland (6).

3. The unpowered water purification system as claimed in claim 1, wherein a 10 cm thick layer of gravels is paved on the bottom surface of the watercourses, and the diameter of the gravels being 1-2 cm.

4. The unpowered water purification system as claimed in claim 1, wherein a triangular base (7) is disposed at a lower portion of and behind the revetment (5) for reinforcing the revetment (5).

5. The unpowered water purification system as claimed in claim 1, wherein a reinforcing rib is provided at the periphery of the gabion mesh (21), a metal circle (27) being disposed on the soil circle (25) for facilitating the growth of the plant (4), and 8 lacing wires being disposed between the upper edge of the gabion mesh (21) and the metal circle (27).

6. The unpowered water purification system as claimed in claim 1, wherein a water-resistant tree is planted on the soil circle (25), and the water-resistant tree is selected from *Taxodium distichum, Taxodium mucronatum* or a combination thereof.

7. The unpowered water purification system as claimed in claim 1, wherein an emerged plant is planted on the gravel circle (24), and the emerged plant is selected from the group of *Iris pseudacorus* L., *Iris tectorum, Canna indica* L., *Pontederia cordata* L, *Pontederia cordata* pickerelweed, *Cyperus alternifolius, Thalia dealbata, Lythrum salicaria* or *Phragmites*.

* * * * *